(12) United States Patent
Fujimori et al.

(10) Patent No.: US 6,355,768 B1
(45) Date of Patent: Mar. 12, 2002

(54) POLYCARBONATE RESIN AND PROCESS FOR PRODUCING THE SAME

(75) Inventors: Takayasu Fujimori; Masukazu Hirata, both of Tsukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/868,508

(22) PCT Filed: Oct. 29, 1999

(86) PCT No.: PCT/JP99/06008

§ 371 Date: Jun. 18, 2001

§ 102(e) Date: Jun. 18, 2001

(87) PCT Pub. No.: WO01/32745

PCT Pub. Date: May 10, 2001

(51) Int. Cl.$^7$ ............................................. C08G 64/00
(52) U.S. Cl. ......................................... 528/196; 528/198
(58) Field of Search ........................................ 528/196

(56) References Cited

U.S. PATENT DOCUMENTS 5,545,710 A * 8/1996 Haese et al. ................ 528/201

FOREIGN PATENT DOCUMENTS

| JP | 6-25398 | * | 2/1994 |
| JP | 8-134199 | * | 5/1996 |
| JP | 10-101786 | * | 4/1998 |
| JP | 10-176046 | * | 6/1998 |
| JP | 11-228683 | * | 8/1999 |

* cited by examiner

Primary Examiner—Terressa M. Boykin
(74) Attorney, Agent, or Firm—Sughrue Mion, PLLC

(57) ABSTRACT

Provided is a polycarbonate resin consisting essentially of structural units of the structure formula (1) and the structure formula (2), wherein a molar ratio of the structure formula (1)/the structure formula (2) is 70/30 to 5/95.

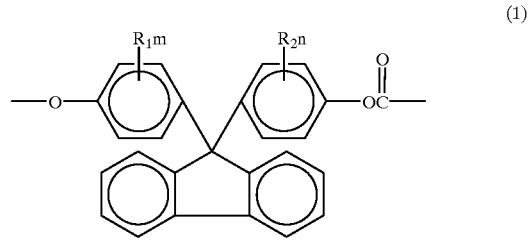

(1)

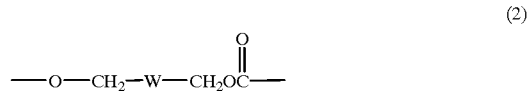

(2)

8 Claims, No Drawings

POLYCARBONATE RESIN AND PROCESS FOR PRODUCING THE SAME

TECHNICAL FIELD

The present invention relates to a polycarbonate resin with transparency, heat resistance, a low photoelastic constant and impact resistance and a process for producing the same. The polycarbonate resin is suitably applicable to materials of plastic optical products such as optical disc substrates, various lenses, prisms and optical fibers.

BACKGROUND ART

A polycarbonate resin from 2,2-bis(4-hydroxy-phenyl) propane (so-called bisphenol A) obtained by reaction of bisphenol A with phosgene or carbonic acid diester is applied widely to not only structural materials, but also optical materials such as optical disc substrates, various lenses, prisms and optical fibers, since it has excellent heat resistance, excellent transparency and furthermore excellent mechanical properties such as impact resistance.

However, the polycarbonate resin made from bisphenol A has a problem in which double refraction becomes large due to molecular orientation and residual stress during molding, since it is a material with a high photoelastic constant and a low flowability. Thus, when an optical material composed of the polycarbonate resin made from bisphenol A is molded, a method for lowering double refraction of its product by molding at a high temperature using a polycarbonate resin with comparatively low molecular weight has been applied. However, since there is a limit for lowering double refraction of the polycarbonate resin produced from bisphenol A, even when the above-mentioned method is applied, a material with further low photoelastic constant and high flowability has been earnestly required in a partial field of optical material, particularly in the field of optical disc with recent expansion of use of optical material.

As a method for lowering a photoelastic constant of a polycarbonate resin, for example, as shown in Japanese Patent Kokai (Laid-open) No.64-66234, copolymerizing bisphenol A with tricyclo $(5.2.1.0^{2,6})$ decane dimethanol is known. However, this method causes deterioration of heat resistance and does not provide sufficient effects in lowering photoelastic constant.

Further, as disclosed in Japanese Patent Kokai (Laid-open) Nos. 6-25398 and 7-109342, processes for copolymerizing bisphenols having a fluorene structure on side chains with other bisphenols are known, but these processes have problems that a glass transition point becomes high and furthermore flowability during melting is low, so that it is difficult to form a thin molded article such as an optical disc substrate since bisphenols containing a fluorene structure are used in a high proportion in order to lower a photoelastic constant.

DISCLOSURE OF THE INVENTION

An object of the present invention is to solve above-mentioned prior art problems and provide a polycarbonate resin which has a lower photoelastic constant than a polycarbonate resin from bisphenol A and a process for producing the same.

As a result of extensive studies to solve above-mentioned prior art problems, the inventors have found that the problems can be solved by providing a polycarbonate resin consisting essentially of structural units of the structure formula (1) and the structure formula (2) wherein a molar ratio of the structure formula (1)/structure formula (2) is 70/30 to 5/95, and have accomplished the present invention.

That is, the present invention provides a polycarbonate resin consisting essentially of structural units of the structure formula (1) and the structure formula (2), wherein a molar ratio of the structure formula (1)/the structure formula (2) is 70/30 to 5/95.

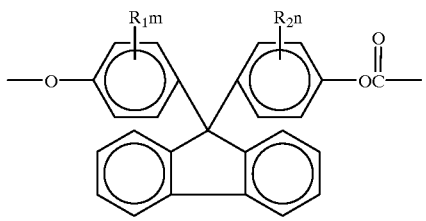

(1)

wherein $R_1$ and $R_2$ are, each independently, hydrogen atom, halogen atom, an alkyl group having 1 to 20 carbon atoms, an alkoxyl group having 1 to 20 carbon atoms, an cycloalkyl group having 6 to 20 carbon atoms, an aryl group having 6 to 20 carbon atoms, a cycloalkoxyl group having 6 to 20 carbon atoms or an aryloxy group having 6 to 20 carbon atoms and m and n are an integer of 0 to 4.

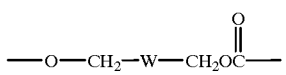

(2)

wherein W is an cycloalkylene group having 6 to 20 carbon atoms and 1 to 4 cyclo rings.

The present invention provides also a polycarbonate resin consisting essentially of structural units represented by the above-mentioned structure formula (1) and structure formula (2) and a structural unit represented by the structure formula (3), wherein a molar ratio (3)/[(1)+(2)] of the structure unit represented by the structure formula (3)/the structural units represented by the structure formula (1) and the structure formula (2) is 50/50 to 10/90.

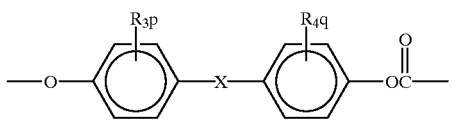

(3)

wherein X is:

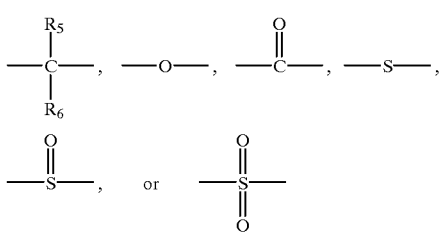

$R_5$ and $R_6$ are, each independently, hydrogen atom, an alkyl group having 1 to 10 carbon atoms or an aryl group having 6 to 10 carbon atoms; a combination of $R_5$ and $R_6$ may form a ring; $R_3$ and $R_4$ are, each independently, hydrogen atom, halogen atom, an alkyl group having 1 to 20 carbon atoms, an alkoxyl group having 1 to 20 carbon atoms; a cycloalkyl group having 6 to 20 carbon atoms, an aryl group having 6 to 20 carbon atoms, a cycloalkoxyl group having 6 to 20 carbon atoms or an aryloxy group having 6 to 20 carbon atoms and p and q are an integer of 0 to 4.

Further the present invention provides a process for producing above-mentioned polycarbonate resin.

The polycarbonate resin of the present invention will be described in detail below.

The polycarbonate resin of the present invention is obtained by polycondensation of structural units derived from an aromatic dihydroxy compound represented by the general formula (4) and an aliphatic dihydroxy compound represented by the general formula (5) and a carbonic acid diester.

(4)

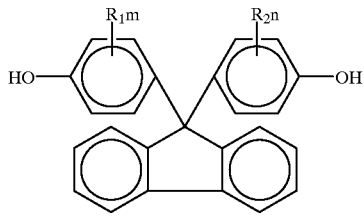

wherein $R_1$ and $R_2$ are, each independently, hydrogen atom, halogen atom, an alkyl group having 1 to 20 carbon atoms, an alkoxyl group having 1 to 20 carbon atoms, a cycloalkyl group having 6 to 20 carbon atoms, an aryl group having 6 to 20 carbon atoms, a cycloalkoxyl group having 6 to 20 carbon atoms or an aryloxy having 6 to 20 carbon atoms and m and n are an integer of 0 to 4.

$$HO-CH_2-W-CH_2-OH \quad (5)$$

wherein W is a cycloalkylene group having 6 to 20 carbon atoms and 1 to 4 cyclo rings.

Examples of aromatic dihydroxy compound represented by the general formula (4) include 9,9-bis(4-hydroxyphenyl) fluorene, 9,9-bis(4-hydroxy-3-methylphenyl) fluorene and 9,9-bis(4-hydroxy-3-ethylphenyl) fluorene.

Examples of aliphatic dihydroxy compound represented by the general formula (5) include cyclohexane-1,4-dimethanol, norbornane dimethanol, tricyclo(5.2.1.0$^{2,6}$) decane dimethanol and decalin-2,6-dimethanol.

A molar ratio (1)/(2) of structural unit(1) derived from the aromatic dihydroxy compound represented by the general formula (4) to structural unit (2) derived from the aliphatic dihydroxy compound represented by the general formula (5) is usually 70/30 to 5/95, preferably 70/30 to 10/90 and more preferably 70/30 to 20/80. That is, when a molar ratio (1)/(2) of structural unit (1) derived from the aromatic dihydroxy compound represented by the general formula (4) to structural unit (2) derived from the aliphatic dihydroxy compound in a polycarbonate resin is above 70/30, a glass transition temperature becomes high, so that it is not preferable since flowability during molding is deteriorated. Further, when it is below 5/95, a glass transition temperature becomes low, so that it is not preferable since it becomes difficult to use practically it due to deterioration of heat resistance.

In the polycarbonate resin of the present invention, it is preferable from the viewpoint of property balance to introduce a structural unit of an aromatic dihydroxy compound represented by the below general formula (6) in addition to a structural unit derived the aromatic dihydroxy compound represented by the above-mentioned general formula (4), a structural unit derived from the aliphatic dihydroxy compound represented by the above-mentioned general formula (5) and a structural unit derived from carbonic acid diester.

(6)

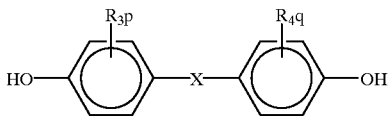

wherein X is:

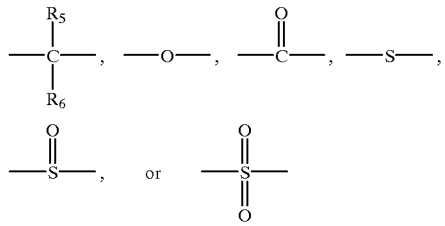

$R_5$ and $R_6$ are, each independently, hydrogen atom, an alkyl group having 1 to 10 carbon atoms or an aryl group having 6 to 10 carbon atoms; a combination of $R_5$ and $R_6$ may form a ring; $R_3$ and $R_4$ are, each independently, hydrogen atom, halogen atom, an alkyl group having 1 to 20 carbon atoms, an alkoxyl group having 1 to 20 carbon atoms, a cycloalkyl group having 6 to 20 carbon atoms, an aryl group having 6 to 20 carbon, a cycloalkoxyl group having 6 to 20 carbon atoms or an aryloxy group having 6 to 20 carbon atoms and p and q are an integer of 0 to 4.

Examples of aromatic dihydroxy compound represented by the general formula (6) include bis(4-hydroxyphenyl) methane, 1,1-bis(4-hydroxyphenyl)ethane, 2,2-bis(4-hydroxyphenyl)propane, 2,2-bis(4-hydroxy-phenyl)butane, 2,2-bis(4-hydroxyphenyl)octane, bis(4-hydroxyphenyl) phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxy-phenyl) cyclopentane, 1,1-bis(4-hydroxyphenyl)cyclo-hexane, 2,2-bis(4-hydroxy-3-methoxyphenyl)propane, 4,4'-dihydroxydiphenyl ether, 4,4'-dihydroxy-3,3'-dimethylphenyl ether, 4,4'-dihydroxydiphenyl sulfide, 4,4'-dihydroxy-3,3'-dimethyldiphenyl sulfide, 4,4'-dihydroxydiphenyl sulfoxide, 4,4'-dihydroxy-3,3'-dimethyldiphenyl sulfoxide, 4,4'-dihydroxydiphenyl sulfone and 4,4'-dihydroxy-3,3'-dimethyldiphenyl sulfone.

Impact resistance can be improved by containing structural unit (3) derived from the aromatic dihydroxy compound represented by the above-mentioned general formula (6) in the polycarbonate resin of the present invention. It is preferable that a molar ratio (3)/[(1)+(2)] of structural unit (3) to structural unit (1) derived from the aromatic dihydroxy compound represented by the general formula (4) and structural unit (2) derived from the aliphatic dihydroxy compound represented by the general formula (5) is 50/50 to 10/90. When it is above 50/50, it is not preferable since photoelastic constant becomes large, whereas below 10/90 it is not preferable since an effect to improve impact strength becomes small.

In the present invention, as the aromatic dihydroxy compound represented by the above-mentioned general formula (6), 2,2-bis(4-hydroxyphenyl)propane (so-called bisphenol A) is suitably used. Bisphenol A is very useful since it has been produced in a low cost and in a large amount as a raw material of a polycarbonate resin and its use makes it possible to increase impact resistance without impairing heat resistance.

The polycarbonate resin of the present invention exhibits a low photoelastic constant, high heat resistance and high impact resistance since it includes a structural unit derived from the aromatic dihydroxy compound represented by the general formula (4) and a structural unit derived from the aliphatic dihydroxy compound derived from the general formula (5), and further also a structural unit from the aromatic dihydroxy compound represented by the general formula (6) in a specific proportion, having a random, block or alternating copolymerization structure.

The photoelastic constant of the polycarbonate resin in the present invention is preferably $50 \times 10^{-12} m^2/N$ or below and more preferably $40 \times 10^{-12} m^2/N$ or below. When the photoelastic constant is above $50 \times 10^{-12} m^2/N$, it is not preferable since double retraction becomes large, for example, its use as optical disc substrate causes a large error in reading signals.

Further, the glass transition temperature of the polycarbonate resin in the present invention is preferably 100° C. or above and 220° C. or below and more preferably 100° C. or above and 190° C. or below. When the glass transition temperature is below 100° C., it is not preferable since heat resistance is deteriorated, so that environment for use is limited. When the glass transition temperature is above 220° C., it is not preferable since flowability is deteriorated, so that it becomes difficult to obtain optical uniformity of a molded article and furthermore, when its molecular weight is maintained to a low level in order to ensure flowability, it is not preferable since impact strength is deteriorated.

Examples of the carbonic acid ester to be used in the present include diphenyl carbonate, ditolyl carbonate, bis (chlorophenyl) carbonate, m-cresyl carbonate, dinaphthyl carbonate, dimethyl carbonate, diethyl carbonate, dibutyl carbonate and dicyclohexyl carbonate, among which diphenyl carbonate is preferable. Diphenyl carbonate is used preferably in a molar ratio of 0.97 to 1.10 and more preferably in a molar ratio of 0.98 to 1.03 per total 1 mol of aromatic dihydroxy compound and aliphatic dihydroxy compound.

The polystyrene conversion weight average molecular weight of the polycarbonate resin is preferably 20,000 to 200,000 and more preferably 35,000 to 100,000. When the polystyrene conversion weight average molecular is below 20,000 it is not preferable since impact resistance is deteriorated, whereas above 200,000 it is not preferable since flowability is deteriorated.

In the process for producing the polycarbonate resin of the present invention, a basic compound is used as a catalyst. Examples of the basic compound include alkaline metal compounds and/or alkaline earth metal compounds and nitrogen-containing compounds.

As such compounds, organic acid salts, inorganic salts, oxides, hydroxides, hydrides or alkoxides of alkaline metal and alkaline earth metal, tetraammonium hydroxide and salts thereof and amines are preferably used and these compound can be used alone and in combination thereof.

Examples of the alkaline metal compound include sodium hydroxide, potassium hydroxide, cesium hydroxide, lithium hydroxide, sodium hydrogencarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenylborate, sodium benzoate, potassium benzoate, cesium benzoate, lithium benzoate, disodium hydrogenphosphate, dipotassium hydrogenphosphate, dilithium hydrogenphosphate, disodium phenylphosphate, disodium salt of bisphenol A, dipotassium salt of bisphenol A, dicesium salt of bisphenol A, dilithium salt of bisphenol A, sodium salt of phenol, potassium salt of phenol, cesium salt of phenol and lithium salt of phenol.

Examples of the alkaline earth metal compounds include magnesium hydroxide, calcium hydroxide, strontium hydroxide, barium hydroxide, magnesium hydrogencarbonate, calcium hydrogencarbonate, strontium hydrogencarbonate, barium hydrogencarbonate, magnesium carbonate, calcium carbonate, strontium carbonate, barium carbonate, magnesium acetate, calcium acetate, strontium acetate, barium acetate, magnesium stearate calcium stearate, calcium benzoate and magnesium phenylphosphate.

Examples of the nitrogen-containing compound include quaternary ammonium hydroxides having alkyl group or aryl group including tetramethylammonium hydroxide, tetraethylammonium hydroxide, tetrapropylammonium hydroxide, tetrabutylammonium hydroxide and trimethylbenzylammonium hydroxide, tertiary amines including triethylamine, dimethylbenzylamine and triphenylamine, secondary amines including diethylamine and dibutylamine, primary amines including propylamine and butylamine, imidazoles including 2-methylimidazole, 2-phenylimidazole and benzoimidazol and bases or basic salts including ammonia, tetramethylammonium borohydride, tetrabutylammonium borohydride, tetrabutylammonium tetraphenylborate and tetraphenylammonium tetraphenylborate.

The catalyst is used in a molar ratio of $10^{-9}$ to $10^{-3}$ mol and preferably $10^{-7}$ to $10^{-5}$ mol per total 1 mol of aromatic dihydroxy compound and aliphatic dihydroxy compound.

The transesterification in the present invention can be performed by known melt poly-condensation process. That is, melt polycondensation is performed by transesterification with heating under atmospheric pressure or a reduced pressure using above-mentioned raw materials and catalyst while removing by-products.

The reaction is usually performed in multiple stages of two stages or above. The first stage reaction is performed at a temperature of 120 to 260° C. and preferably 180 to 240° C. for 0.1 to 5 hours and preferably 0.5 to 3 hours. Then, the reaction of an aromatic dihydroxy compound, an aliphatic dihydroxy compound and a carbonic acid diester is performed while increasing the degree of reduced pressure in the reaction system and elevating the reaction temperature and finally polycondensation is performed under a reduced pressure of 1 mmHg or below at a temperature of 200 to 350° C. Such reaction may be performed in a continuous process or in a batch wise. The reaction apparatus to be used in above-mentioned reaction may a vertical type reaction apparatus equipped with anchor type stirring blade, maxblend stirring blade, helicalribbon type stirring blade, etc., a horizontal type reaction apparatus equipped with paddle blade, lattice blade, spectacle shaped blade and an extruder type reaction apparatus equipped with a screw and it is suitable to use a combination of above-mentioned reaction apparatuses.

In the process of producing the polycarbonate resin, after the completion of the polymerization reaction, the catalyst is removed or deactivated in order to maintain heat stability and hydrolysis stability of the polycarbonate resin thus obtained. Usually, a method for deactivating the catalyst by addition of known acid substance is suitably applied.

Examples of the acid substance include aromatic sulfonic acids including p-toluene sulfonic acid, aromatic sulfonates including butyl p-toluenesulfonate and hexyl p-toluenesulfonate, organic halides including stearyl chloride, benzoyl chloride and p-toluenesulfonyl chloride, alkyl sulfate including dimethyl sulfate and organic halides including benzyl chloride.

After the deactivation of the catalyst, a step to remove low boiling point compounds in the polymer with vaporization under a pressure of 0.1 to 1 mmHg at a temperature of 200 to 350° C. may be added. For its purpose, a horizontal apparatus equipped with a stirring blade with excellent surface renewing capacity such as paddle blade, lattice blade, spectacle shaped blade, etc. or thin film vaporizer is suitably used.

In the present invention, in addition to above-mentioned heat stabilizer and hydrolysis stabilizer, additives such as an antioxidant, a pigment, a dye, a reinforcing agent, a filler, an ultraviolet absorber, a lubricating agent, a releasing agent, a crystal nuclear agent, a plasticizer, a flowability improving agent, an antistatic agent, an antibacterial agent, etc., may be used.

Regarding the timing to add above-mentioned additives, they may be added during which melting state of the polycarbonate resin is maintained just after the reaction or further added after pelletizing the polycarbonate resin. In the addition of plural additives, the timing of addition may be changed, respectively.

Where the additives are added to the polycarbonate resin in which melting state is maintained just after the reaction, a process comprising adding them to the resin withdrawn from the reactor, then transferring it into a horizontal kneading machine to knead uniformly and then pelletizing or a process comprising transferring the resin withdrawn from the reactor into a horizontal kneading machine and adding them via side feed to the kneading machine to knead uniformly and then pelletizing is suitably applied.

When they are added to a pelletized resin, a process comprising mixing and dispersing the pellets and above-mentioned additives and agents with a mixer including, typically, a tumbler mixer, a Henschel mixer, a ribbon blender, a super mixer and then melt kneading with a kneading machine such as an extruder, Bumbary mixer, rolls are suitably selected.

BEST MODE FOR CARRYING OUT THE INVENTION

The present invention will be described in more detail below, referring to Examples, which are not intended to limit the scope of the present invention.

EXAMPLE 1

49.2 g (0.13 mol) of 9,9-bis(4-hydroxy-3-methylphenyl) fluorene, 10.1 g (0.07 mol) of cyclohexane-1,4-dimethanol, 43.4 g (0.2 mol) of diphenyl carbonate and $5 \times 10^{-5}$ g ($6 \times 10^{-7}$ mol) of sodium hydrogencarbonate was charged to a four-neck flask of capacity 300 ml equipped with a stirrer and a distiller and then heated at 180° C. under nitrogen atmosphere of 760 mmHg and then stirred for 30 minutes.

Then, the reduced pressure degree in the interior of the flask was adjusted to 150 mmHg and the temperature in the interior of the flask was elevated up to 200° C. at the rate of 60° C./hr and maintained to 200° C. for 40 minutes and the transesterification reaction was performed. The temperature was further elevated up to 225° C. at the rate of 75° C./hr, and after 40 minutes of the completion of elevation of the temperature, the reduced pressure degree was set to 1 mmHg or below over one hour while maintaining 225° C. Then, the temperature was elevated up to 285° C. at the rate of 105° C./hr and the reaction was performed with stirring for total 8.5 hours. After the completion of the reaction, nitrogen was injected into the interior of the reactor to return to atmospheric pressure and a polycarbonate resin thus produced was withdrawn. The measured results of the properties of the polycarbonate resin thus obtained were shown in Table 1.

EXAMPLE 2

The experiment was performed in the same manner as in Example 1 except that 37.8 g (0.1 mol) of 9,9-bis(4-hydroxy-3-methylphenyl) fluorene and 19.6 g (0.1 mol) of tricyclo $(5.2.1.0^{2,6})$ decane dimethanol were used and the reaction was performed at 270° C. as the final temperature for total 7.5 hours with stirring. The measured results of the properties of the polycarbonate resin thus obtained were shown in Table 1.

EXAMPLE 3

The experiment was performed in the same manner as in Example 1 except that 22.7 g (0.06 mol) of 9,9-bis(4-hydroxy-3-methylphenyl) fluorene and 27.5 g (0.14 mol) of tricyclo (5.2.1.02,6) decane dimethanol were used and the reaction was performed at 260° C. as the final temperature for total 7 hours with stirring. The measured results of the properties of the polycarbonate resin thus obtained were shown in Table 1.

EXAMPLE 4

The experiment was performed in the same manner as in Example 1 except that 6.05 g (0.016 mol) of 9,9-bis(4-hydroxy-3-methylphenyl) fluorene and 36.5 g (0.184 mol) of trans-decalin-2(e),6(e)-dimethanol were used and the reaction was performed at 260° C. as the final temperature for total 6 hours with stirring. The measured results of the properties of the polycarbonate resin thus obtained were shown in Table 1.

EXAMPLE 5

The experiment was performed in the same manner as in Example 1 except that 7.57 g (0.02 mol) of 9,9-bis(4-hydroxy-3-methylphenyl) fluorene, 23.6 g (0.12 mol) of tricyclo $(5.2.1.0^{2,6})$ decane dimethanol and 13.7 g (0.06 mol) of 2,2-bis(4-hydroxyphenyl) propane and the reaction was performed at 260° C. as the final temperature for total 7 hours. The measured results of the properties of the polycarbonate resin thus obtained were shown in Table 2.

EXAMPLE 6

The experiment was performed in the same manner as in Example 1 except that 15.1 g (0.04 mol) of 9,9-bis(4-hydroxy-3-methylphenyl) fluorene, 23.6 g (0.12 mol) of tricyclo $(5.2.1.0^{2,6})$ decane dimethanol and 9.15 g (0.04 mol) of 2,2-bis(4-hydroxyphenyl) propane were used and the reaction was performed at 260° C. as the final temperature for total 7 hours with stirring. The measured results of the properties of the polycarbonate resin thus obtained were shown in Table 2.

COMPARATIVE EXAMPLE 1

The experiment was performed in the same manner as in Example 1 except that 75.7 g (0.2 mol) of 9,9-bis(4-hydroxy-3-methylphenyl) fluorene was used and the final temperature was 340° C. and cyclohexane-1,4-dimethanol was not used. The measured results of the properties of the polycarbonate resin thus obtained were shown in Table 2. It was impossible to prepare a cast film and a press test price, so that photoelastic constant and falling ball impact strength could not be measured.

COMPARATIVE EXAMPLE 2

The experiment was performed in the same manner as in Example 1 except that 39.3 g (0.20 mol) of tricyclo $(5.2.1.0^{2,6})$ decane dimethanol was used instead of cyclohexane-1,4-dimethanol and the reaction was performed at 260° C. as the final temperature for total 7 hours and 9,9-bis(4-hydroxy-3-methylphenyl) fluorene was not used. The measured results of the properties of the polycarbonate resin thus obtained were shown in Table 2.

The properties in Table 1 and 2 were measured according to the following methods.

1) Polystyrene conversion-weight average molecular weight (Mw):

The measurement was performed by GPC using mono-dispersed polystyrene having a known molecular weight as a standard substance and chloroform as a developing solvent.

2) Glass transition temperature (Tg) m:

The measurement was performed by a differential scanning calorimeter

3) Thermal decomposition starting temperature (Td):

A temperature decreased weight by 1% in a nitrogen stream by a thermobalance. The temperature elevation rate was 10° C./min.

4) Photoelastic constant:

Double refraction for change of load was measured by applying a light of wave length 633 nm to a cast film of thickness 100 μm with Ellipsometer and it was calculated based on the measured results.

5) Falling ball impact strength:

A steel ball was free fallen on a press test piece of diameter 40 mm and thickness 3 mm from a height of 127 cm and it was represented by maximum weight of the steel ball in which the test piece was not broken.

The following abbreviations were used for the compounds in Table.

BCF: 9,9-bis(4-hydroxy-3-methylphenyl) fluorene
CHDM: cyclohexane-1,4-dimethanol
TCDDM: tricyclo $(5.2.1.0^{2,6})$ decane dimethanol
BPA: 2,2-bis(4-hydroxyphenyl) propane

INDUSTRIAL APPLICABILITY

The polycarbonate resin of the present invention is a novel aliphatic-aromatic copolymerization polycarbonate resin with a low photoelastic constant maintaining characteristics of an aromatic polycarbonate resin such as excellent transparency, heat resistance and impact strength and very usefully applicable to materials of plastic optical products such as optical disc substrates, various lenses, prisms and optical fibers.

TABLE 1

|  | Example 1 | Example 2 | Example 3 | Example 4 |
|---|---|---|---|---|
| Molar ratio | BCF/CHDM 65/35 | BCF/TCDDM 50/50 | BCF/TCDDM 30/70 | BCF/DDM 8/92 |
| Mw | 53000 | 60100 | 62300 | 79500 |
| Tg (° C.) | 185 | 160 | 133 | 102 |
| Td (° C.) | 341 | 320 | 312 | 318 |
| Photoelastic constant $(10^{-12}m^2/N)$ | 28 | 25 | 23 | 17 |
| Falling ball impact strength (g) | 66 | 78 | 95 | 95 |

TABLE 2

|  | Example 5 | Example 6 | Comp. Ex 1 | Comp. Ex 2 |
|---|---|---|---|---|
| Molar ratio | BCF/TCDDM/BPA 10/60/30 | BCF/TCDDM/BPA 20/60/20 | BCF 100 | TCDDM 100 |
| Mw | 60300 | 64000 | 18500 | 92000 |
| Tg (° C.) | 115 | 129 | 295 | 82 |
| Td (° C.) | 328 | 315 | 399 | 320 |
| Photoelastic constant $(10^{-12}m^2/N)$ | 31 | 26 | * | 13 |
| Falling ball impact strength (g) | 198 | 151 | * | 95 |

Note
* it was impossible to measure.

What is claimed is:

1. A polycarbonate resin consisting essentially of structural units of the structure formula (1) and the structure formula (2), wherein a molar ratio of the structure formula (1)/the structure formula (2) is 70/30 to 5/95:

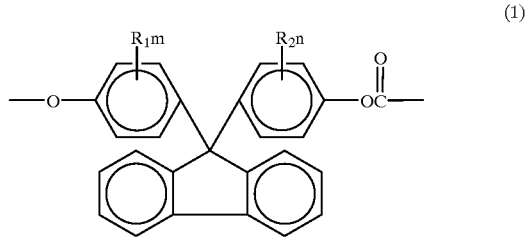

(1)

wherein $R_1$ and $R_2$ are, each independently, a hydrogen atom, a halogen atom, an alkyl group having 1 to 20 carbon atoms, an alkoxyl group having 1 to 20 carbon atoms, a cycloalkyl group having 6 to 20 carbon atoms, an aryl group having 6 to 20 carbon atoms, a cycloalkoxyl group having 6 to 20 carbon atoms or an aryloxy group having 6 to 20 carbon atoms and m and n are an integer of 0 to 4;

(2)

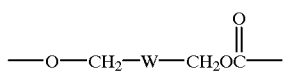

wherein W is a cycloalkylene group having 6 to 20 carbon atoms and 1 to 4 cyclo rings.

2. The polycarbonate resin according to claim 1, having a photoelastic constant of $50 \times 10^{-12}$ m²/N or below.

3. A polycarbonate resin consisting essentially of structural units represented by the structure formula (1) and the structure formula (2) and a structural unit represented by the structure formula (3), wherein a molar ratio (3)/[(1)+(2)] of the structure unit represented by the structure formula (3)/ the structural units represented by the structure formula (1) and the structure formula (2) is 50/50 to 10/90:

(1)

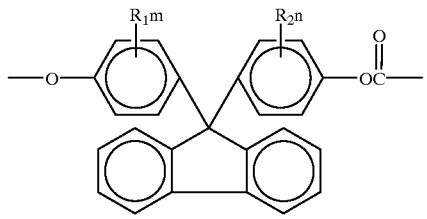

wherein $R_1$ and $R_2$ are, each independently, a hydrogen atom, a halogen atom, an alkyl group having 1 to 20 carbon atoms, an alkoxyl group having 1 to 20 carbon atoms, a cycloalkyl group having 6 to 20 carbon atoms, an aryl group having 6 to 20 carbon atoms, a cycloalkoxyl group having 6 to 20 carbon atoms or an aryloxy group having 6 to 20 carbon atoms and m and n are an integer of 0 to 4;

(2)

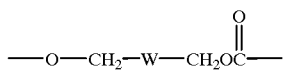

wherein W is a cycloalkylene group having 6 to 20 carbon atoms and 1 to 4 cyclo rings;

(3)

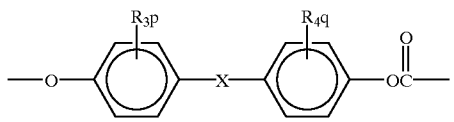

wherein X is:

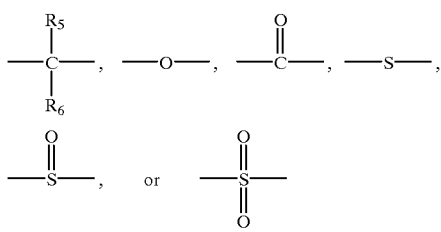

$R_5$ and $R_6$ are, each independently, a hydrogen atom, an alkyl group having 1 to 10 carbon atoms or an aryl group having 6 to 10 carbon atoms; a combination of $R_5$ and $R_6$ may form a ring; $R_3$ and $R_4$ are, each independently, a hydrogen atom, a halogen atom, an alkyl group having 1 to 20 carbon atoms, an alkoxyl group having 1 to 20 carbon atoms; a cycloalkyl group having 6 to 20 carbon atoms, an aryl group having 6 to 20 carbon atoms, a cycloalkoxyl group having 6 to 20 carbon atoms or an aryloxy group having 6 to 20 carbon atoms and p and q are an integer of 0 to 4.

4. The polycarbonate resin according to claim 3, having a photoelastic constant of $50 \times 10^{-12}$ m²/N or below.

5. The polycarbonate resin according to claim 3, wherein $R_5$ and $R_6$ in the structure formula (3) are each a methyl group.

6. A process for producing a polycarbonate resin which comprises performing melt polycondensation of the general formula (4), the general formula (5) and a carbonic acid diester or the general formula (4), the general formula (5), the general formula (6) and a carbonic acid diester in the presence of a basic compound catalyst:

(4)

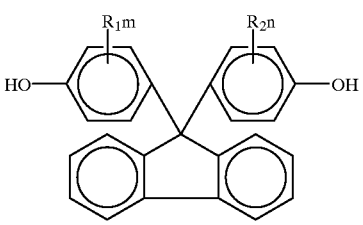

wherein $R_1$ and $R_2$ are, each independently, a hydrogen atom, a halogen atom, an alkyl group having 1 to 20 carbon atoms, an alkoxyl group having 1 to 20 carbon atoms, a cycloalkyl group having 6 to 20 carbon atoms, an aryl group having 6 to 20 carbon atoms, a cycloalkoxyl group having 6 to 20 carbon atoms or an aryloxy group having 6 to 20 carbon atoms and m and n are an integer of 0 to 4:

$$HO—CH_2—W—CH_2—OH \quad (5)$$

wherein W is a cycloalkylene group having 6 to 20 carbon atoms and 1 to 4 cyclo rings:

(6)

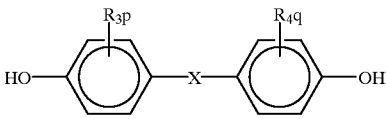

wherein X is:

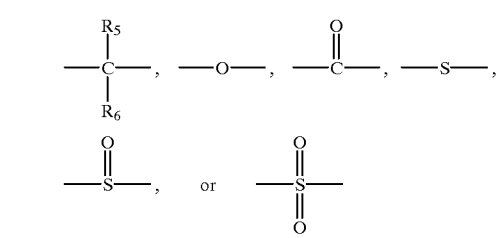

$R_5$ and $R_6$ are, each independently, an alkyl group having 1 to 10 carbon atoms, an aryl group having 6 to 10 carbon atoms; a combination of $R_5$ and $R_6$ may form a ring; $R_3$ and $R_4$ are, each independently, a hydrogen atom, a halogen atom, an alkyl group having 1 to 20 carbon atoms, an alkoxyl group having 1 to 20 carbon atoms, a cycloalkyl group having 6 to 20 carbon atoms, an aryl group having 6 to 20 carbon, a cycloalkoxyl group having 6 to 20 carbon atoms or an aryloxy group having 6 to 20 carbon atoms and p and q are an integer of 0 to 4.

7. The process for producing a polycarbonate resin according to claim 6, using a catalyst comprising $10^{-9}$ to $10^{-3}$ mol of a basic compound to total 1 mol of aromatic dihydroxy compounds (4) and (6) and aliphatic dihydroxy compound (5).

8. The process for producing a polycarbonate resin according to claim 6, wherein $R_5$ and $R_6$ in the aromatic dihydroxy compound represented by the general formula (6) are each a methyl group.

* * * * *